Patented May 5, 1953

2,637,725

UNITED STATES PATENT OFFICE 2,637,725

COLLOIDAL FLAVONOL SYSTEM

Charles F. Krewson, Abington, Pa., assignor to the United States of America as represented by the Secretary of Agriculture No Drawing. Application November 2, 1951, Serial No. 254,626

6 Claims. (Cl. 260—210)

(Granted under Title 35, U. S. Code (1952), sec. 266)

The invention herein described may be manufactured and used by or for the Government of the United States of America for governmental purposes throughout the world without payment to me of any royalty thereon.

This invention relates to colloidal systems containing flavonols.

Flavonols, such as rutin, robinin, quercetin, quercitrin and quercetagetin, which possess valuable therapeutic properties, are soluble in water at room temperature (about 25° C.) to only slight extent; rutin, for example, is soluble to the extent of only about 0.013 gram per 100 grams of water. These flavonols therefore cannot be effectively utilized in the form of aqueous solutions.

According to the present invention, water-soluble systems containing the therapeutically unaltered flavonols are formed by the interaction of these flavonols with an aqueous colloidal sol prepared from saccharated ferric oxide (N. F. VII). Homogeneous aqueous colloidal flavonol saccharated ferric oxide sols can thus be formed which contain amounts of flavonols substantially in excess of the amounts which can be dissolved by equal volumes of water at the same temperature, and these sols are completely stable on storage at room temperature.

The therapeutic use of saccharated ferric oxide by mouth and by intravenous injection as a nutritional source of iron is already well established.

Although hypothesis as to the nature of the interaction involved is conjectural, it is believed that the flavonols become an integral part of the colloidal saccharated ferric oxide sol particles, and that these newly-formed particles have independent dispersion properties which differ from the solubility properties of the original flavonols. This is signified by the fact that colloidal saccharated ferric oxide sols in the concentration range used have a pH of about 9.7 to 9.9 which is reduced to almost neutral by complexing with the flavonols.

This complexing of the flavonols and neutralization makes the dispersions of this invention especially attractive for either oral administration or intravenous injection. The two therapeutically active agents may be administered in complete compatibility in one admixture, the saccharated ferric oxide for treatment of hypochromic anemia, and the flavonol, such as rutin, for treatment of capillary fragility and other blood vascular disorders.

In accordance with the method of this invention, the flavonol in varying amounts is admixed with aqueous colloidal saccharated ferric oxide sols of various concentrations. The resulting mixtures may be shaken or heated to facilitate reaction, and may then be filtered to remove any traces of unreacted flavonol.

Depending upon the nature of the flavonol and the strength of the saccharated ferric oxide sol, the process can be conducted at room or at an elevated temperature.

The following examples illustrate the invention:

Example I 50.0 g. of saccharated ferric oxide (N. F. VII) was dissolved in 70 ml. of distilled water. The pH of this saccharated ferric oxide sol was 9.7. To this was added 2.50 g. of rutin and the admixture was brought to about boiling temperature with continuous stirring. The preparation was then filtered, cooled to room temperature, and diluted to a volume of 100 ml. with distilled water.

The resulting aqueous colloidal rutin saccharated ferric oxide sol has a pH of 7.6. The rutin does not precipitate on storage and the preparation remains sterile.

Similar preparations containing less rutin were prepared by analogous procedures. More dilute and slightly more concentrated saccharated ferric oxide sols may be used.

Example II 3.00 g. of saccharated ferric oxide was dissolved in 4 ml. of distilled water. The sol was made to a volume of 6 ml. and 0.200 g. of robinin was added. The admixture was brought to about boiling temperature under reflux with agitation. It was filtered, cooled to room temperature, and made to a volume of 6 ml. with distilled water.

The resulting aqueous colloidal robinin saccharated ferric oxide sol is stable and remains sterile.

Example III

A saccharated ferric oxide sol was prepared in the quantity described in Example I. To this was added 1.50 g. of quercetin and the preparation was brought to about the boiling temperature with continuous stirring. The admixture was filtered, cooled to room temperature, and made to 100 ml. volume with distilled water.

This preparation has a pH of 8.0, is sterile and is stable.

Example IV

A sol containing 50.0 g. of saccharated ferric oxide was prepared as described in Example I. To this was added 3.00 g. of quercitrin and the admixture was heated to about boiling temperature with stirring. The preparation was filtered, cooled to room temperature, and diluted to a volume of 100 ml. with distilled water.

The pH of this preparation is 7.6. It remains sterile and is stable.

*Example V*

2.00 g. of saccharated ferric oxide was added to 3 ml. of distilled water, stirred until dispersed, and diluted to 4 ml. volume with distilled water. 0.0820 g. of quercetagetin was then added, the admixture was heated to boiling temperature under reflux, filtered, cooled to room temperature, and made to a volume of 4 ml. with distilled water. The resulting aqueous colloidal quercetagetin saccharated ferric oxide sol is stable and sterile.

I claim:

1. A process comprising interacting a flavonol with an aqueous colloidal saccharated ferric oxide sol to produce a stable homogeneous aqueous colloidal flavonol saccharated ferric oxide sol.

2. The process of claim 1 wherein the flavonol is rutin.

3. The process of claim 1 wherein the flavonol is robinin.

4. The process of claim 1 wherein the flavonol is quercetin.

5. The process of claim 1 wherein the flavonol is quercitrin.

6. The process of claim 1 wherein the flavonol is quercetagetin.

CHARLES F. KREWSON.

References Cited in the file of this patent

Thomas Chemical Abstracts, vol. 24 (1930), pg. 2358.

U. S. Dispensatory 24th ed. (1947), pgs. 1452, 1574, 1575.